US012770444B2

(12) United States Patent
Wen et al.

(10) Patent No.: US 12,770,444 B2
(45) Date of Patent: Oct. 20, 2026

(54) VEHICLE PARALLEL DIAGNOSIS METHOD, APPARATUS, AND SYSTEM, COORDINATOR, AND MEDIUM

(71) Applicant: Chongqing Changan Automobile Co Ltd, Chongqing (CN)

(72) Inventors: Yong Wen, Chongqing (CN); Jing Huang, Chongqing (CN); Wenjuan Zhu, Chongqing (CN)

( * ) Notice: Subject to any disclaimer, the term of this patent is extended or adjusted under 35 U.S.C. 154(b) by 224 days.

(21) Appl. No.: 18/522,319

(22) Filed: Nov. 29, 2023

(65) Prior Publication Data

US 2024/0177542 A1 May 30, 2024

(30) Foreign Application Priority Data

Nov. 29, 2022 (CN) ......................... 202211511823.1

(51) Int. Cl.
*G07C 5/08* (2006.01)
*G07C 5/00* (2006.01)

(52) U.S. Cl.
CPC ........... *G07C 5/0808* (2013.01); *G07C 5/008* (2013.01)

(58) Field of Classification Search
CPC .................. G07C 5/0808; G07C 5/008; H04L 2012/40215; H04L 2012/40273; H04L 67/60; H04L 12/12
See application file for complete search history.

(56) References Cited

U.S. PATENT DOCUMENTS 4,077,253 A * 3/1978 Grisell .................. G01V 1/282 73/606
7,941,531 B2 * 5/2011 Gunduzhan ........... H04L 47/805 709/224
9,537,953 B1 * 1/2017 Dadashikelayeh ... G06F 16/951
11,516,194 B2 * 11/2022 Kim .................... H04W 12/041
2007/0073460 A1 * 3/2007 Bertosa ................. G01M 15/02 701/31.4
2013/0031212 A1 * 1/2013 Enosaki .................. H04L 69/28 709/218

(Continued)

FOREIGN PATENT DOCUMENTS

CN 110223415 A * 9/2019 ........... G07C 5/0808
CN 112565341 A * 3/2021 ........... H04L 67/565

*Primary Examiner* — Redhwan K Mawari
*Assistant Examiner* — Kai Wang
(74) *Attorney, Agent, or Firm* — JMB DAVIS BEN-DAVID

(57) ABSTRACT

A vehicle parallel diagnosis method and apparatus, a coordinator, a system, and a medium, relating to the technical field of vehicle diagnosis, are disclosed. The method includes: receiving a diagnostic request message transmitted by a random client; detecting a current diagnostic state of a diagnostic server after the diagnostic request message is received, the current diagnostic state including a completed state and an uncompleted state; and forwarding, when the current diagnostic state is the completed state, the diagnostic request message to the diagnostic server via a target routing controller, otherwise controlling the random client to retransmit the diagnostic request message after a target delay duration until the diagnostic server is in the completed state, and forwarding the diagnostic request message to the diagnostic server via the target routing controller so as to process the diagnostic request message.

8 Claims, 7 Drawing Sheets

(56) References Cited

U.S. PATENT DOCUMENTS

| | | | | |
|---|---|---|---|---|
| 2016/0364437 | A1* | 12/2016 | Djurdjevic | G06Q 40/04 |
| 2018/0316584 | A1* | 11/2018 | Ujiie | H04L 43/0823 |
| 2019/0362262 | A1* | 11/2019 | Inagi | G06F 30/20 |
| 2022/0329354 | A1* | 10/2022 | Zhou | H04L 43/0829 |
| 2022/0329519 | A1* | 10/2022 | Wang | H04L 1/1628 |
| 2023/0318823 | A1* | 10/2023 | Geng | G07C 5/0808<br>701/32.6 |
| 2024/0062595 | A1* | 2/2024 | Palai | B60W 50/0205 |

* cited by examiner

VEHICLE PARALLEL DIAGNOSIS METHOD, APPARATUS, AND SYSTEM, COORDINATOR, AND MEDIUM

FIELD OF THE INVENTION

The present disclosure relates to the technical field of vehicle diagnosis, and in particular, to a vehicle parallel diagnosis method and apparatus, a coordinator, a system, and a medium.

BACKGROUND OF THE INVENTION

At present, with the increasing complexity of a vehicle intelligent system, scenarios of multi-path parallel diagnosis are increasing, the problem of diagnostic conflict is increasingly prominent, and the demands of parallel diagnosis are increasing.

In the related technology, a manner of solving parallel diagnosis is mainly achieved by setting priorities of different sub-network diagnostic messages in a gateway device. For example, it is set in a gateway that a forwarding priority of a diagnostic message for diagnosing a controller area network (CAN) (a CAN where an on-board diagnostics (OBD) port is located) is higher than that of a CAN corresponding to remote diagnostic. In this way, when a local diagnostic request and a remote diagnostic request come simultaneously, the gateway will preferentially forward diagnostic messages inputted from the local OBD port and no longer forward remote diagnostic messages. This manner can solve the confusion caused by a diagnostic crash, but has the disadvantage that the demands for full-time parallel diagnosis cannot be achieved.

In this manner, only the diagnostic message of one sub-network can be guaranteed to be valid at the same time, and the diagnostic messages of other sub-networks will not be forwarded. Once there is a periodic diagnostic request in a sub-network with a high priority (as in the foregoing case of uninterrupted data collection in a power domain and a cockpit domain for 24 hours throughout the day), the gateway can only forward the diagnostic message of the sub-network with a high priority for a long time, thereby causing timeout of the diagnostic requests of other sub-networks eventually and functional abnormality of the client. Finally, the parallel diagnosis function cannot be realized.

SUMMARY OF THE INVENTION

The present disclosure provides a vehicle parallel diagnosis method and apparatus, a coordinator, a system, and a storage medium, intended to solve the problem of diagnostic conflicts in multiple possible vehicle parallel diagnosis scenarios such as production line electric detection, road test, air upgrade, and remote diagnostic, so as to realize a real sense of multi-path parallel diagnosis.

According to embodiments in a first aspect of the present disclosure, a vehicle a parallel diagnosis method is provided, including the following steps: receiving a diagnostic request message transmitted by a random client; detecting a current diagnostic state of a diagnostic server after the diagnostic request message is received, the current diagnostic state including a completed state and an uncompleted state; and forwarding, when the current diagnostic state is the completed state, the diagnostic request message to the diagnostic server via a target routing controller, otherwise controlling the random client to retransmit the diagnostic request message after a target delay duration until the diagnostic server is in the completed state, and forwarding the diagnostic request message to the diagnostic server via the target routing controller so as to process the diagnostic request message.

According to the foregoing technical means, in the embodiments of the present disclosure, a diagnostic request message received during server diagnosis may be delayed and circularly retransmitted until the server diagnosis is completed, whereby a diagnostic crash may be avoided through a crash backoff strategy, and the situation where a diagnostic request is not responded to or the diagnostic request is ignored may be effectively avoided. Compared with the problem of diagnostic conflicts in multiple possible vehicle parallel diagnosis scenarios such as production line electric detection, road test, air upgrade, and remote diagnostic in the related technology, the requirements for full-time vehicle parallel diagnosis may be truly met, and full-time multi-path parallel diagnosis may be achieved.

Further, before controlling the random client to retransmit the diagnostic request message after a target delay duration, the method also includes: acquiring an accumulated number of retransmissions of the diagnostic request message; and determining the target delay duration according to the accumulated number.

According to the foregoing technical means, since the target delay duration is determined based on the number of re-forwarding, the delay duration of each re-forwarding may be different, thus effectively avoiding mechanical interval transmission. Therefore, after a client delays for a random time, a diagnostic request may be initiated again, thus reducing the number of transmissions to a certain extent while avoiding diagnostic crashes, and saving processing resources.

Further, the determining the target delay duration according to the accumulated number includes: determining whether the accumulated number reaches a predetermined number; calculating the target delay duration according to the accumulated number when the accumulated number is less than or equal to the predetermined number, and generating a delay queue based on the target delay duration corresponding to each delay when the accumulated number is equal to the predetermined number; and randomly acquiring the target delay duration from the delay queue when the accumulated number is greater than the predetermined number. A calculation formula of the target delay duration is:

$$\text{target duration}=2^{N}*\Delta T,$$

where N is the accumulated number, and ΔT is a predetermined interval duration.

According to the foregoing technical means, if the target delay duration increases with the accumulated number, the request may be ignored or even unable to be responded. Therefore, when the accumulated number reaches a certain value, a delay queue may be generated, and the delay duration may be randomly acquired through the delay queue, so as to improve the reliability of delay diagnosis and avoid the situation where the diagnostic request is not responded or the diagnostic request is ignored.

Further, the detecting a current diagnostic state of a diagnostic server includes: detecting an actual detection duration of the diagnostic server; determining that the current diagnostic state is the completed state when the actual detection duration is greater than a predetermined diagnostic duration; and determining, if a response message transmitted by the diagnostic server is received, that the current diagnostic state is the completed state, otherwise determining that the current diagnostic state is the uncompleted state, when the actual detection duration is less than or equal to the predetermined diagnostic duration.

According to the foregoing technical means, in the embodiments of the present disclosure, it may be determined whether the diagnosis of the diagnostic server is completed through the diagnostic duration and the response message, and the current diagnostic state of the diagnostic server may be determined in time, thus avoiding the situation where the current cannot be determined due to timeout of a diagnostic service response, and improving the reliability of parallel diagnosis.

Further, the forwarding the diagnostic request message to the diagnostic server also includes: acquiring, in the presence of a plurality of diagnostic request messages actually, an actual request moment of each diagnostic request message; and forwarding a diagnostic request message corresponding to the earliest actual request moment to the diagnostic server, and updating the current diagnostic state into the uncompleted state.

According to the foregoing technical means, when there are a plurality of diagnostic request messages, in response to the earliest request message, other messages are delayed and retransmitted, a crash backoff strategy may be used to avoid diagnostic crashes, and the situation where the diagnostic request is not responded to or the diagnostic request is ignored may be effectively avoided, full-time vehicle parallel diagnosis requirements may be truly met, and full-time multi-path parallel diagnosis may be realized.

Further, the forwarding a diagnostic request message corresponding to the earliest actual request moment to the diagnostic server includes: acquiring, in the presence of a plurality of diagnostic request messages corresponding to the earliest actual request moment, an actual diagnostic type corresponding to each diagnostic request message; and matching a priority of each diagnostic request message according to the actual diagnostic type, and forwarding a diagnostic request message with the highest priority to the diagnostic server.

According to the foregoing technical means, since a diagnostic order cannot be determined according to a request moment when transmission moments of a plurality of diagnostic requests are consistent, the priority may be set according to the importance of diagnosis, and the diagnostic order at this moment may be determined according to the priority, thus avoiding the situation where the diagnosis cannot be performed when the plurality of diagnostic requests are simultaneously enabled, and improving the reliability of diagnosis.

According to embodiments in a second aspect of the present disclosure, a vehicle a parallel diagnosis apparatus is provided, including: a receiving module, configured to receive a diagnostic request message transmitted by a random client; a detection module, configured to detect a current diagnostic state of a diagnostic server after the diagnostic request message is received, the current diagnostic state including a completed state and an uncompleted state; and a coordination module, configured to forward, when the current diagnostic state is the completed state, the diagnostic request message to the diagnostic server via a target routing controller, otherwise control the random client to retransmit the diagnostic request message after a target delay duration until the diagnostic server is in the completed state, and forward the diagnostic request message to the diagnostic server via the target routing controller so as to process the diagnostic request message.

Further, the apparatus also includes: a calculation module, configured to acquire an accumulated number of retransmissions of the diagnostic request message before controlling the random client to retransmit the diagnostic request message after a target delay duration, and determine the target delay duration according to the accumulated number.

Further, the calculation module is further configured to: determine whether the accumulated number reaches a predetermined number; calculate the target delay duration according to the accumulated number when the accumulated number is less than or equal to the predetermined number, and generate a delay queue based on the target delay duration corresponding to each delay when the accumulated number is equal to the predetermined number; and randomly acquire the target delay duration from the delay queue when the accumulated number is greater than the predetermined number.

Further, a calculation formula of the target delay duration is:

$$\text{target duration}=2^N*\Delta T,$$

where N is the accumulated number, and ΔT is a predetermined interval duration.

Further, the detection module is further configured to: detect an actual detection duration of the diagnostic server; determine that the current diagnostic state is the completed state when the actual detection duration is greater than a predetermined diagnostic duration; and determine, if a response message transmitted by the diagnostic server is received, that the current diagnostic state is the completed state, otherwise determine that the current diagnostic state is the uncompleted state, when the actual detection duration is less than or equal to the predetermined diagnostic duration.

Further, the coordination module is further configured to: acquire, in the presence of a plurality of diagnostic request messages actually, an actual request moment of each diagnostic request message; and forward a diagnostic request message corresponding to the earliest actual request moment to the diagnostic server, and update the current diagnostic state into the uncompleted state.

Further, the coordination module is further configured to: acquire, in the presence of a plurality of diagnostic request messages corresponding to the earliest actual request moment, an actual diagnostic type corresponding to each diagnostic request message; and match a priority of each diagnostic request message according to the actual diagnostic type, and forward a diagnostic request message with the highest priority to the diagnostic server.

According to embodiments in a third aspect of the present disclosure, a diagnostic service coordinator is provided, including: a memory, a processor, and a computer program stored on the memory and executable on the processor. The processor executes the program to implement the vehicle parallel diagnosis method according to the foregoing embodiments.

According to embodiments in a fourth aspect of the present disclosure, a vehicle parallel diagnosis system is provided, including: at least one client, configured to transmit a diagnostic request message; a diagnostic server, configured to diagnose the at least one client in response to the at least one diagnostic request message; and the diagnostic service coordinator according to the foregoing embodiments.

According to embodiments of a fifth aspect of the present disclosure, a computer-readable storage medium is provided, including a computer program stored thereon. The program is executed by a processor to implement the vehicle parallel diagnosis method according to the foregoing embodiments.

Thus, the present disclosure has at least the following beneficial effects.

In the embodiments of the present disclosure, a diagnostic request message received during server diagnosis may be delayed and circularly retransmitted until the server diagnosis is completed, whereby a diagnostic crash may be avoided through a crash backoff strategy, and the situation where a diagnostic request is not responded to or the diagnostic request is ignored may be effectively avoided. The requirements for full-time vehicle parallel diagnosis may be truly met, and full-time multi-path parallel diagnosis may be achieved. Thus, the problem of diagnostic conflicts in multiple possible vehicle parallel diagnosis scenarios such as production line electric detection, road test, air upgrade, and remote diagnostic is solved, so as to realize a real sense of multi-path parallel diagnosis.

Additional aspects and advantages of the present disclosure will be set forth in part in the description which follows and, in part, will be obvious from the description, or may be learned by practice of the present disclosure.

BRIEF DESCRIPTION OF THE DRAWINGS

The foregoing and/or additional aspects and advantages of the present disclosure will become apparent and more readily appreciated from the following description of embodiments, taken in conjunction with the accompanying drawings in which.

DETAILED DESCRIPTION OF THE EMBODIMENTS

Figure 1:
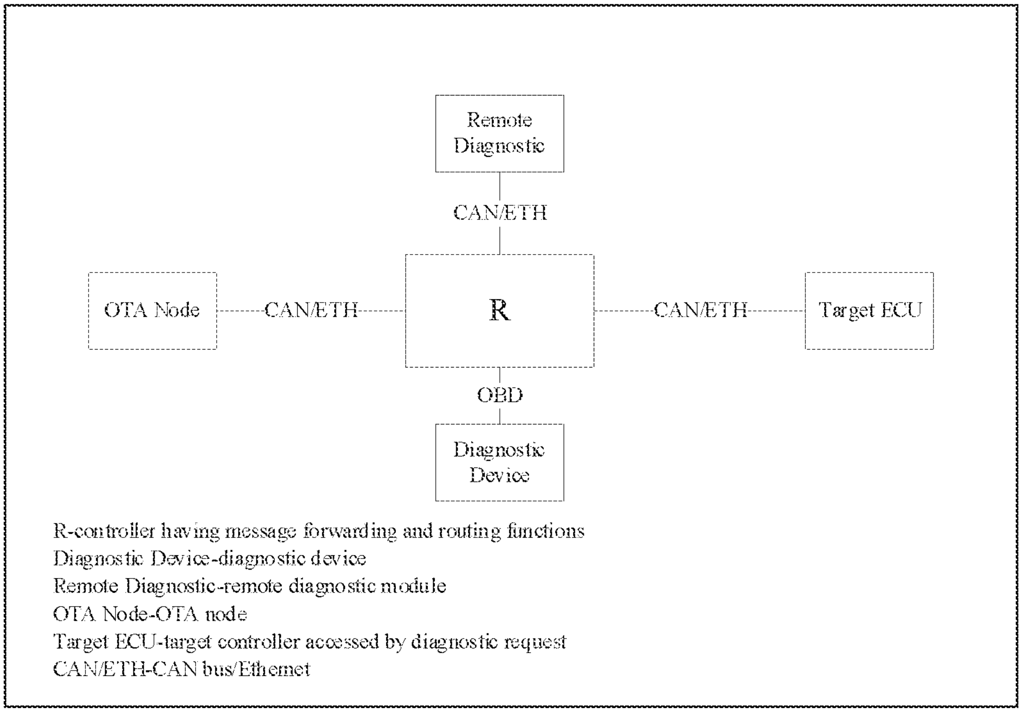
FIG. 1 is a schematic diagram of a first vehicle parallel diagnosis structure according to the related technology.

Reference will now be made in detail to the embodiments of the present disclosure, examples of which are illustrated in the accompanying drawings, where like or similar reference numerals refer to the same or similar elements or elements having the same or similar function throughout. The embodiments described below with reference to the accompanying drawings are exemplary and are intended to be illustrative of the present disclosure and are not to be construed as limiting the present disclosure.

The current demands for parallel diagnosis are reflected in two main aspects.

First, the current problem of vehicle diagnostic conflict is solved. Currently, in a large environment where an over-the-air technology (OTA) is used as a vehicle standard function, multiple parallel diagnosis conflicts are inevitable. Since the entire vehicle OTA needs to implement upgrade related functions such as ECU version acquisition and installation and writing based on a diagnostic protocol, there is a possibility of conflict between a diagnostic service request and a diagnostic device from an OBD port when OTA related functions are executed. For example, the conflict between an OBD electric detection device on a production line and an OTA version collection function affects production beat, the conflict between an OBD port data collection device and OTA during vehicle road test, and the like. Furthermore, remote diagnostic has gradually become the standard function of a vehicle, and there is a conflict between a remote diagnostic module and OTA and OBD port diagnostic devices, which results in abnormal functions of parties requesting the diagnostic service.

FIG. 1 shows a typical parallel diagnosis structure on a current vehicle, including an OTA node, a remote diagnostic module, a diagnostic device accessed from an OBD port, and a controller having a message forwarding and routing function, which may currently be a domain controller such as a gateway, BDC, and VIU, and a target controller responding to a diagnostic service request, which is referred to as a diagnostic server. The OTA node, the remote diagnostic module, and the OBD port diagnostic device serve as a diagnostic service request initiator, which is referred to as a diagnostic client. The diagnostic client is not limited to the OTA node, the remote diagnostic module, and the OBD port diagnostic device, but may be a random controller.

Figure 2:
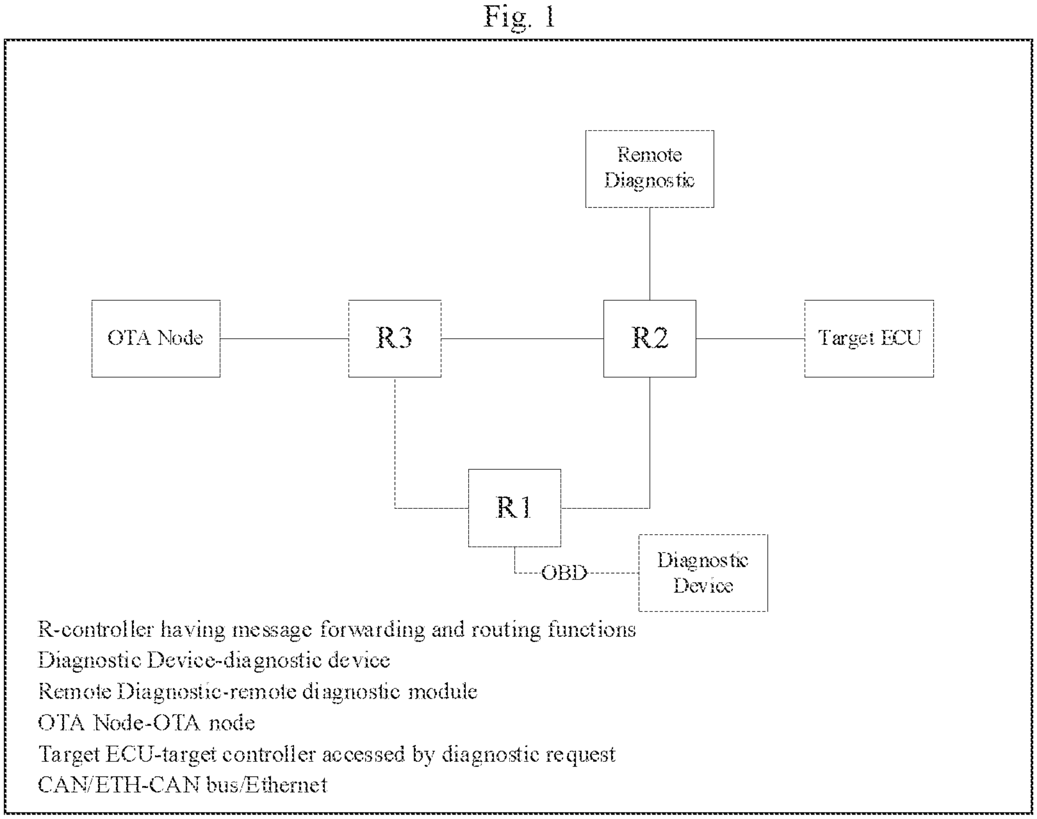
FIG. 2 is a schematic diagram of a second vehicle parallel diagnosis structure according to the related technology.

FIG. 2 shows a typical parallel diagnosis structure on a current vehicle. Compared with a star network topology in FIG. 1, FIG. 2 shows a ring network topology structure. The two structures are typical network structures on the current vehicle. Regardless of FIG. 1 or FIG. 2, logical relationships among a diagnostic client, a diagnostic distribution route, and a diagnostic server are consistent: The client initiates a diagnostic service request, a distribution controller distributes a routing diagnostic service request, and the server executes a diagnostic service and responds to a client service execution result.

Figure 3:
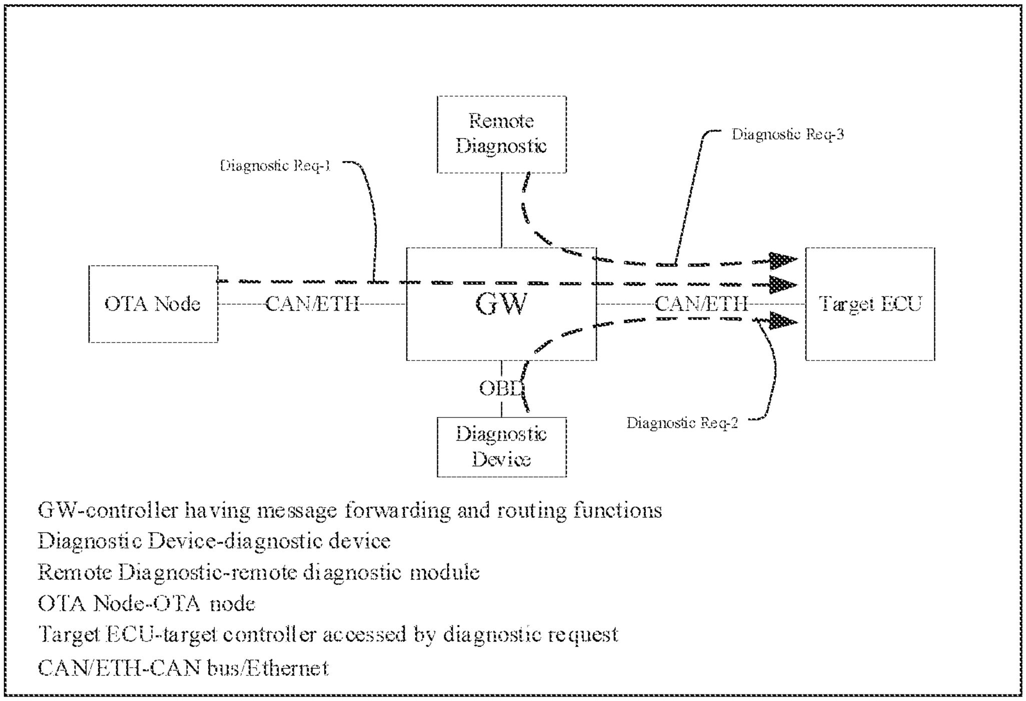
FIG. 3 is a schematic diagram of a conflict of vehicle parallel diagnostic service requests according to an embodiment of the present disclosure.

The diagnostic clients may each independently initiate a diagnostic service request. That is, the diagnostic client, the diagnostic distribution route, and the diagnostic server may initiate a diagnostic service request at the same time or at a short time interval. At this moment, the diagnostic distribution route may forward all the three requests to the diagnostic server, and the three diagnostic requests may have a diagnostic conflict (also referred to as a diagnostic crash) at the diagnostic server, as shown in FIG. 3. The diagnostic crash in the embodiments of the present disclosure includes two scenarios.

When the diagnostic server is processing a request once and does not complete a response to the client, there are other diagnostic requests coming, and the server will disregard the new request, whereby the new request is discarded, and a client diagnostic function corresponding to the request is abnormal.

When the diagnostic server receives a diagnostic request but has not entered a service processing flow, a new request arrives, and the server will discard the old request and execute the latest service request, whereby the old request is discarded, and the corresponding client diagnostic function is abnormal.

Second, business needs for multi-path diagnostic data parallel collection exist. Typically, in an experimental phase of vehicle development, diagnostic data of different domains (body domain, driving domain, power domain, cockpit domain, and the like) may be collected and monitored in parallel through different paths, and most of these collection manners need to be implemented based on diagnostic protocols. For example, current experimental data of the power domain needs to be taken through a professional device plugged to an OBD port, and the device needs to keep plugged on line during the whole road test. At this moment, some data of the body domain needs to be monitored by remote diagnostic for 24 hours throughout the day. On the business, data collection of the two domains is likely to access the same controller, and therefore, there is a high probability of a diagnostic crash.

Therefore, the embodiments of the present disclosure propose a vehicle parallel diagnosis scheme based on a crash backoff algorithm, starting from the design idea of a "shared resource random system", so as to truly meet the requirements of full-time vehicle parallel diagnosis, and achieve full-time multi-path parallel diagnosis by a "crash-backoff" method.

A vehicle parallel diagnosis method and apparatus, a diagnoser, a system, and a storage medium according to embodiments of the present disclosure will be described below with reference to the accompanying drawings. The execution subject of the method of the embodiments of the present disclosure is a diagnostic service coordinator, and before describing the method of the embodiments of the present disclosure, a vehicle parallel diagnosis system is briefly introduced, including a diagnostic request client, a diagnostic message routing controller, a diagnostic service coordinator software module, and a server responding to a diagnostic request. The diagnostic requesting client includes, but is not limited to, an OBD port diagnostic device, a remote diagnostic module, an OTA node, and the like. The diagnostic message routing controller is capable of forwarding and routing a diagnostic message. The diagnostic client transmits a diagnostic request, and the diagnostic server processes the request, and responds to a processing result to the client.

Figure 4:
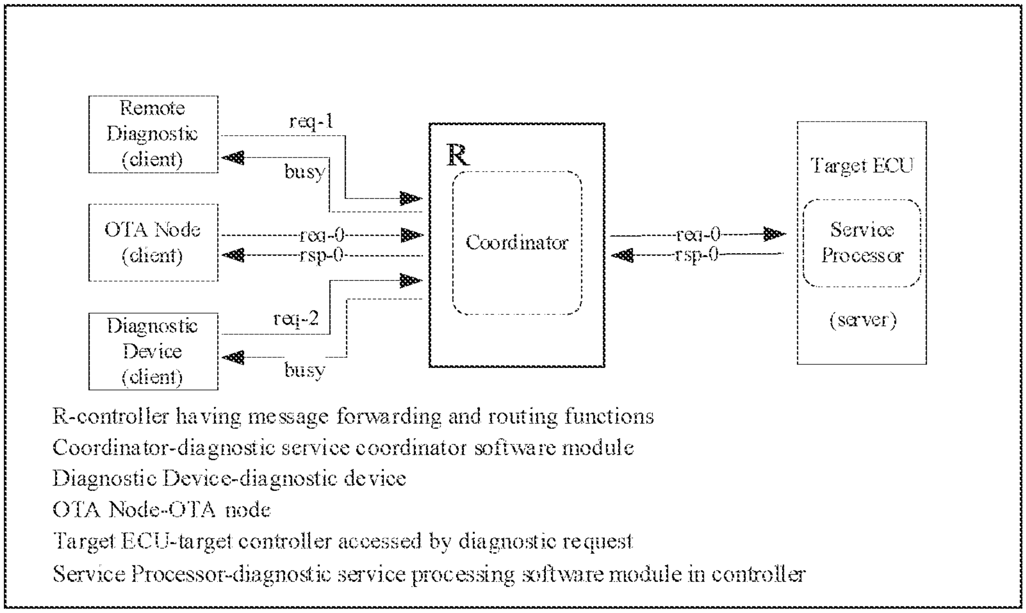
FIG. 4 is a schematic structural diagram of a vehicle parallel diagnosis system according to a first embodiment of the present disclosure.
Figure 5:
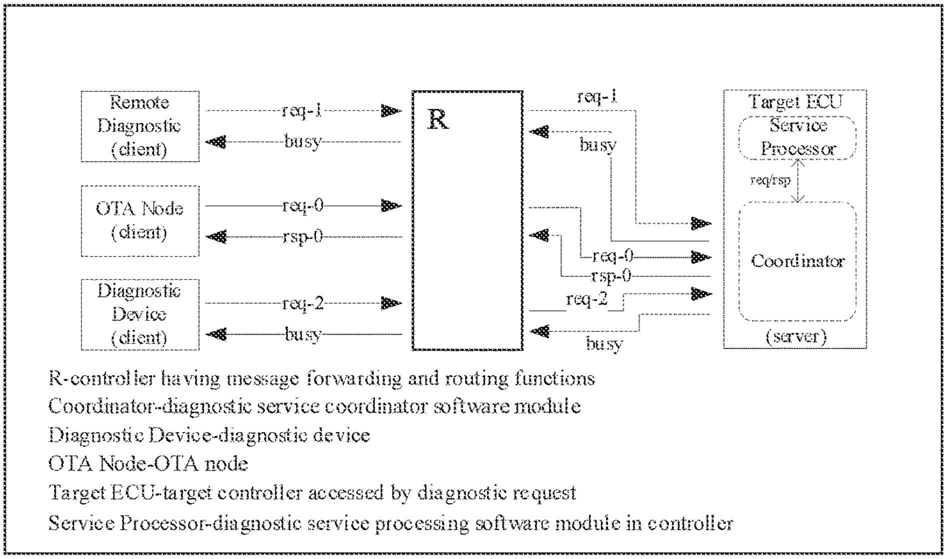
FIG. 5 is a schematic structural diagram of a vehicle parallel diagnosis system according to a second embodiment of the present disclosure.

The parallel diagnosis system in the embodiments of the present disclosure includes two configurations, as shown in FIG. 4 and FIG. 5 respectively. The two configurations differ in the location of the diagnostic service coordinator software module, which may be located in a routing controller or in a controller where the diagnostic server is located.

As shown in FIG. 4, the diagnostic client includes an OBD port diagnostic device, a remote diagnostic module, and an OTA node, and may perform diagnostic message forwarding. The diagnostic message routing controller includes a diagnostic service coordinator software module for managing a diagnostic request, and has the following functions: 1. forwarding of the diagnostic request and crash management; and 2. when the diagnostic request crashes, responding to a diagnostic busy signal busy to the client. The server is configured to process and respond to the diagnostic service request.

In the system shown in FIG. 4, the diagnostic request clients of the embodiments of the present disclosure each independently initiate diagnostic requests that may arrive at the diagnostic message routing controller at very short intervals or at the same time. The diagnostic service coordinator software module in the diagnostic message routing controller preferentially forwards the first received diagnostic service request message. When the first diagnostic service request is not processed and other diagnostic service request messages are subsequently received, the diagnostic service coordinator software module will return a busy signal to the corresponding client. These clients perform a backoff operation according to the number of receptions of the busy signal based on a backoff algorithm, and then initiate a diagnostic request again, and so on, until the diagnostic message routing controller forwards a diagnostic request message thereof, and the clients enter a normal diagnostic processing flow.

As shown in FIG. 5, the diagnostic client includes an OBD port diagnostic device, a remote diagnostic module, and an OTA node. The diagnostic message routing controller has the functions of diagnostic message forwarding and routing. The server includes a diagnostic service processing module for receiving a diagnostic request, executing a diagnostic service, and responding to a diagnostic processing result, and a random controller providing the diagnostic service has the processing module. The diagnostic request of the diagnostic service processing module is from the diagnostic service coordinator software module, and the responding diagnostic result is also transmitted to the diagnostic service coordinator software module.

In the system shown in FIG. 5, the diagnostic request clients of the embodiments of the present disclosure each independently initiate diagnostic requests that may arrive at the diagnostic server at very short intervals or at the same time. The diagnostic service coordinator software module in the diagnostic server preferentially forwards the first received diagnostic service request message to the diagnostic service processing module inside an ECU for processing. When the first diagnostic service request is not processed and other diagnostic service request messages are subsequently received, the diagnostic service coordinator software module will return a busy signal to the corresponding client. In this process, the diagnostic message routing controller acts as a node for message routing and does not process the diagnostic message. The client performs a backoff operation according to the number of receptions of the busy signal based on a backoff algorithm, and then initiates a diagnostic request again, and so on, until the diagnostic message routing controller forwards a diagnostic request message thereof, and the client enters a normal diagnostic processing flow.

Regardless of the structure of FIG. 4 or the structure of FIG. 5, there are three logical roles to implement parallel diagnosis: a diagnostic client, a diagnostic service coordinator, and a diagnostic server. A vehicle parallel diagnosis method according to an embodiment of the present disclosure will be described below with reference to FIG. 6.

Figure 6:
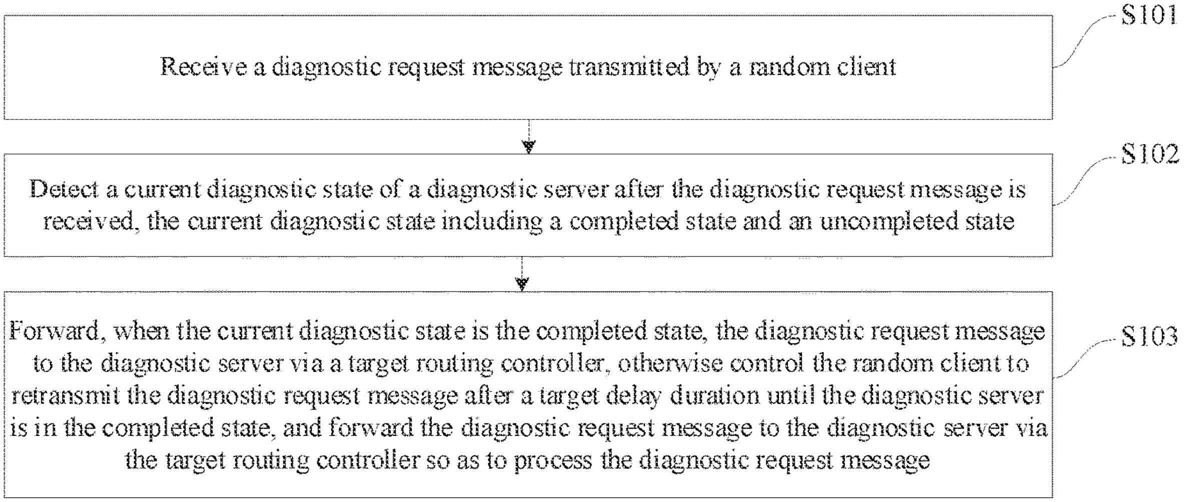
FIG. 6 is a flowchart of a vehicle parallel diagnosis method according to an embodiment of the present disclosure.

Specifically, as shown in FIG. 6, the vehicle parallel diagnosis method includes the following steps.

In step S101, a diagnostic request message transmitted by a random client is received.

The client may include, but is not limited to, an OBD port diagnostic device, a remote diagnostic module, an OTA node, and the like, which is not particularly limited.

It will be appreciated that in the embodiments of the present disclosure, one diagnostic request message may be received at the same time or a plurality of diagnostic request messages may be received at the same time.

In step S102, a current diagnostic state of a diagnostic server is detected after the diagnostic request message is received, the current diagnostic state including a completed state and an uncompleted state.

As a possible implementation, the detecting a current diagnostic state of a diagnostic server includes: detecting an actual detection duration of the diagnostic server; determining that the current diagnostic state is the completed state when the actual detection duration is greater than a predetermined diagnostic duration; and determining, if a response message transmitted by the diagnostic server is received, that the current diagnostic state is the completed state, otherwise determining that the current diagnostic state is the uncompleted state, when the actual detection duration is less than or equal to the predetermined diagnostic duration.

The predetermined diagnostic duration may be understood as a standard diagnostic service response time, and may be specifically set or calibrated according to actual situations, which is not specifically limited.

It will be appreciated that the criteria for determining whether the current diagnostic service has been processed in the embodiments of the present disclosure are as follows.

In the embodiments of the present disclosure, after a diagnostic request is received, the request is transmitted to a diagnostic service processor. If a server responds to a client request and forwards a response message to a client, it is considered that the current diagnostic service request has been processed.

In the embodiments of the present disclosure, after a diagnostic request is received, the request is transmitted to the diagnostic service processor. If a response of a server times out (exceeding a standard diagnostic service response time), it is considered that the current diagnostic service processing is completed.

In other cases, it is considered that the diagnostic service processing is uncompleted.

Figure 7:
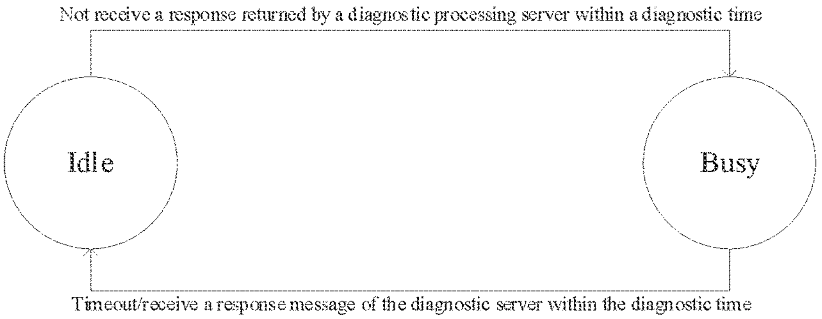
FIG. 7 is a schematic diagram of state transfer according to an embodiment of the present disclosure.

In a specific application, as shown in FIG. 7, when no diagnostic request is received, a diagnostic processing coordinator is in an idle state Idle. In this state, when a random request comes, the diagnostic processing coordinator will forward a diagnostic request. After the diagnostic processing coordinator receives a diagnostic request but does not receive a response returned by the diagnostic processing server within a standard diagnostic service response time, the diagnostic processing coordinator is in a busy state Busy. In this state, when a random diagnostic request is received, a Busy signal will be responded to the client. When the diagnostic processing coordinator receives a diagnostic request and receives a response returned by the diagnostic processing server, the diagnostic processing coordinator forwards the diagnostic response to the client, and then the state is immediately transferred to the idle state Idle. When the diagnostic processing coordinator receives a diagnostic request, but does not receive a response returned by the diagnostic processing server beyond a standard diagnostic service response time, the diagnostic processing coordinator forwards the diagnostic response to the client, and then the state is immediately transferred to the idle state Idle.

In step S103, when the current diagnostic state is the completed state, the diagnostic request message is forwarded to the diagnostic server via a target routing controller, otherwise the random client is controlled to retransmit the diagnostic request message after a target delay duration until the diagnostic server is in the completed state, and the diagnostic request message is forwarded to the diagnostic server via the target routing controller so as to process the diagnostic request message.

Figure 8:
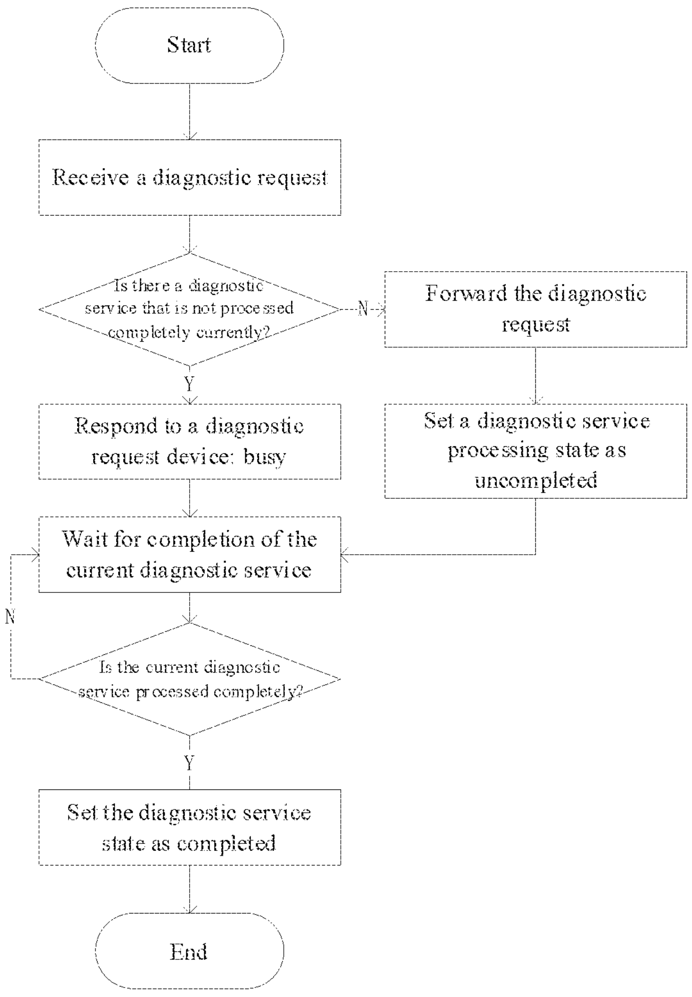
FIG. 8 is a flowchart of processing of a diagnostic service request message according to an embodiment of the present disclosure.

It will be understood that as shown in FIG. 8, in the embodiments of the present disclosure, when a diagnostic request message is received, it is determined whether there is a current diagnostic request that has not been processed completely. If no, the diagnostic request message is forwarded to a target server, a diagnostic service processing state is set as an uncompleted state, and then the currently ongoing diagnostic service waits to be completed. If there is a diagnostic service that has not been processed completely, a busy signal of the client responding to a diagnostic request is executed. If the current diagnostic service is completed, the diagnostic service processing state is a completed state. Otherwise, the currently ongoing diagnostic service continuously waits to be completed.

In the embodiments of the present disclosure, the forwarding the diagnostic request message to the diagnostic server also includes: acquiring, in the presence of a plurality of diagnostic request messages actually, an actual request moment of each diagnostic request message; and forwarding a diagnostic request message corresponding to the earliest actual request moment to the diagnostic server, and updating the current diagnostic state into the uncompleted state.

It will be understood that in the embodiments of the present disclosure, when there are a plurality of diagnostic request messages, in response to the earliest request message, other messages are delayed and retransmitted, a crash backoff strategy may be used to avoid diagnostic crashes, and the situation where the diagnostic request is not responded to or the diagnostic request is ignored may be effectively avoided, full-time vehicle parallel diagnosis requirements may be truly met, and full-time multi-path parallel diagnosis may be realized.

In the embodiments of the present disclosure, the forwarding a diagnostic request message corresponding to the earliest actual request moment to the diagnostic server includes: acquiring, in the presence of a plurality of diagnostic request messages corresponding to the earliest actual request moment, an actual diagnostic type corresponding to each diagnostic request message; and matching a priority of each diagnostic request message according to the actual diagnostic type, and forwarding a diagnostic request message with the highest priority to the diagnostic server.

It will be understood that since a diagnostic order cannot be determined according to a request moment when transmission moments of a plurality of diagnostic requests are consistent, the priority may be set according to the importance of diagnosis, and the diagnostic order at this moment may be determined according to the priority, thus avoiding the situation where the diagnosis cannot be performed when the plurality of diagnostic requests are simultaneously enabled, and improving the reliability of diagnosis.

In the embodiments of the present disclosure, before controlling the random client to retransmit the diagnostic request message after a target delay duration, the method also includes: acquiring an accumulated number of retransmissions of the diagnostic request message; and determining the target delay duration according to the accumulated number.

It will be understood that since the target delay duration is determined based on the number of re-forwarding, the delay duration of each re-forwarding may be different, thus effectively avoiding mechanical interval transmission. Therefore, after a client delays for a random time, a diagnostic request may be initiated again, thus reducing the number of transmissions to a certain extent while avoiding diagnostic crashes, and saving processing resources.

It is to be noted that in the embodiments of the present disclosure, the target delay duration may be determined in a plurality of ways. For example, the target delay duration is calculated according to a calculation formula: target duration=$2^N*\Delta T$. For another example, the target delay duration may be selected randomly through a delay queue, and the like.

As a possible implementation, in the embodiments of the present disclosure, the determining the target delay duration according to the accumulated number includes: determining whether the accumulated number reaches a predetermined number; calculating the target delay duration according to the accumulated number when the accumulated number is less than or equal to the predetermined number, and generating a delay queue based on the target delay duration corresponding to each delay when the accumulated number is equal to the predetermined number; and randomly acquiring the target delay duration from the delay queue when the accumulated number is greater than the predetermined number.

The predetermined number may be specifically set according to actual requirements, and will not be specifically limited.

Specifically, in the embodiments of the present disclosure, a crash backoff algorithm is used to avoid a diagnostic crash, and a crash backoff operation corresponding to the crash backoff algorithm may be understood as: a random time backoff. When the diagnostic crash occurs, the diagnostic client delays for a random time and then initiates a diagnostic request again. The commonly used time backoff algorithm is mainly an exponential backoff algorithm. In a communication network, the most commonly used exponential backoff algorithm is a binary exponential backoff algorithm. The backoff algorithm according to the embodiments of the present disclosure includes an arbitrary temporal backoff and is not limited to an exponential backoff. The backoff operation principle of the binary exponential crash backoff according to the embodiments of the present disclosure will be explained below as follows.

An accumulated number of request crashes which have been received by the diagnostic request client and returned by the diagnostic processing coordinator is set as N. That is, an initial value of a number N of returns of the busy signal by the diagnostic processing coordinator is 0, an increase upper limit value of N is set as MAX, MAX must be an integer constant greater than 2, and a basic backoff time after encountering a first conflict is set as $\Delta T$. A client backoff time queue is set, and there is initially only one element $\Delta T$, represented as [$\Delta T$], in the queue. Whenever the client receives a busy signal, N is incremented by 1, and the increment of N has an upper limit value MAX. When $N \geq MAX$, even if an R response busy signal N is received again, N will not be incremented. An element $2^N\Delta T$ is then added to the queue, and the element in the queue may be represented as [$\Delta T$, $2\Delta T$, $4\Delta T$, . . . , $2^N\Delta T$]. After receiving a busy signal, the client randomly selects a time from the backoff time queue to perform a delay backoff.

Figure 9:
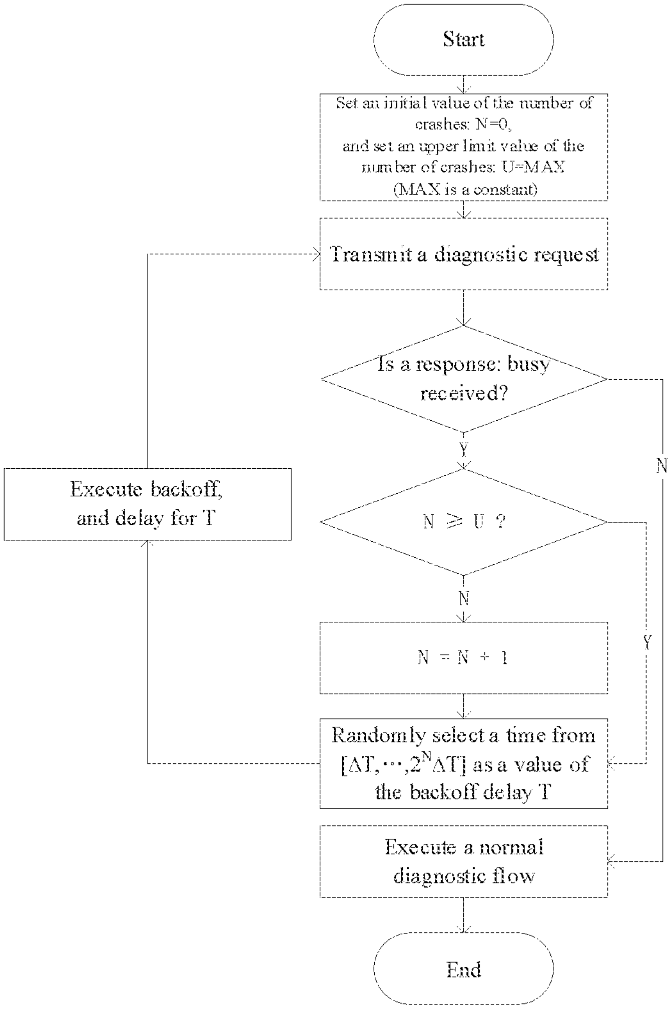
FIG. 9 is a flowchart of a diagnostic service client implementing crash backoff according to an embodiment of the present disclosure.

For example, as shown in FIG. 9, the backoff operation flow of the diagnostic client includes the following steps.

The initial value of the accumulated number N of receptions of the busy signal by the client is set as 0, and the increment upper limit of N is set as MAX.

The client transmits a diagnostic service request. If the R response busy signal is received, step 3 is performed. Otherwise, a normal diagnostic flow is executed.

It is determined whether N is incremented to the upper limit MAX. If no, N is incremented to 1, and then step 4 is performed. Otherwise, N is not incremented, and then step 4 is performed.

An element is randomly selected from the delay queue [$\Delta T$, $2\Delta T$, $4\Delta T$, . . . , $2^N\Delta T$] as a backoff delay time.

The delay backoff is performed, the delay is ended, and step 2 is re-performed.

Figure 10:
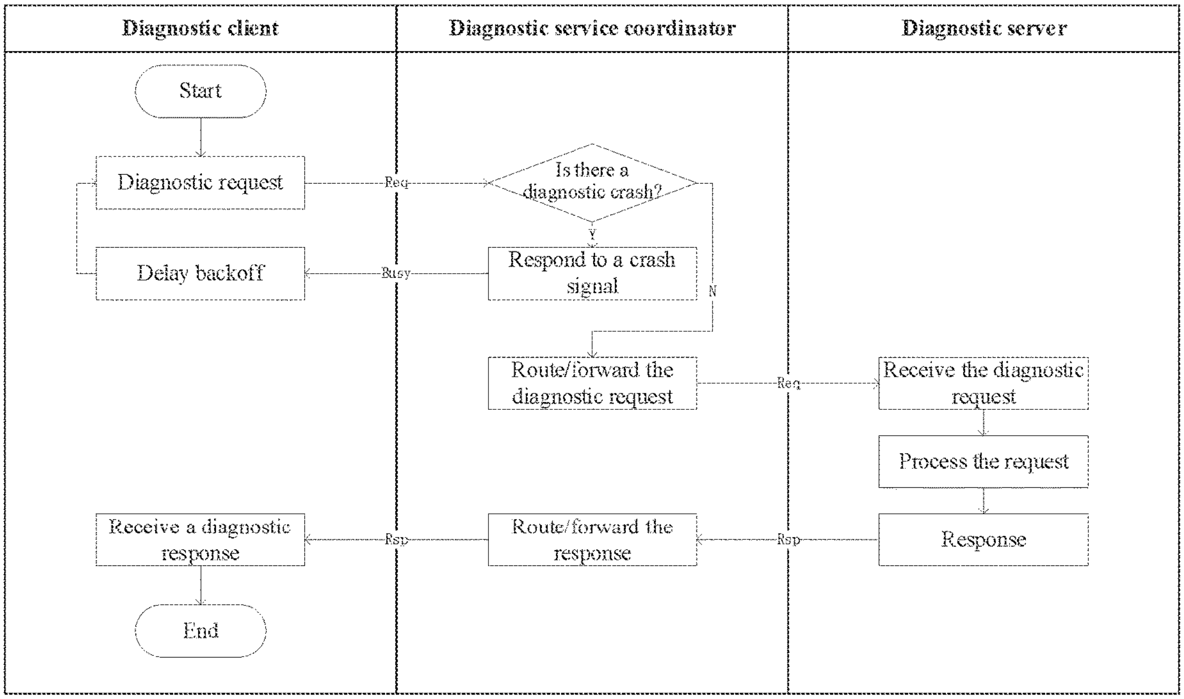
FIG. 10 is a flowchart of operational interaction of a vehicle parallel diagnosis system according to an embodiment of the present disclosure.

The vehicle parallel diagnosis method will now be described with reference to a specific embodiment, as shown in FIG. 10, as follows.

The client initiates a diagnostic request.

After receiving the request, the coordinator determines whether there is a diagnostic crash. If yes, the process proceeds to step 3 in response to a crash signal busy. Otherwise, the process proceeds to step 4.

The client receives the busy signal, and performs a delay backoff operation. Step 1 is re-performed after the delay is ended.

The coordinator forwards the diagnostic service request to the corresponding diagnostic service processor.

After receiving the request, the diagnostic service processor processes the request and responds to a processing result.

The coordinator forwards the processing result to the diagnostic client. At this point, the processing of one diagnostic request is completed.

Thus, the embodiments of the present disclosure may realize a multi-client full-time parallel diagnosis function based on the crash backoff algorithm.

In a specific application, the structures shown in FIG. 4 and FIG. 5 are as follows.

In view of the structure of FIG. 4, the parallel diagnosis method according to the embodiments of the present disclosure includes the following steps.

The clients each independently initiate a diagnostic service request.

The diagnostic service coordinator software module in the diagnostic message routing controller forwards the first received diagnostic request message to the target controller. If the diagnostic service coordinator software module receives a diagnostic request again before the first diagnostic request has been processed, the diagnostic service coordinator software module will return a diagnostic busy signal busy to the corresponding client.

After receiving the busy signal returned by the diagnostic service coordinator software module, the client performs a backoff operation, and then step 1 is performed again.

In view of the structure of FIG. 5, the parallel diagnosis method according to the embodiments of the present disclosure includes the following steps.

The clients each independently initiate a diagnostic service request.

The diagnostic service coordinator software module in the target controller forwards the first received diagnostic request to the diagnostic service processing module inside the controller. If the diagnostic service coordinator software module receives a diagnostic request again before the first diagnostic request has been processed, the diagnostic service coordinator software module will return a diagnostic busy signal busy to the corresponding client.

After receiving the busy signal returned by the diagnostic service coordinator software module, the client performs a backoff operation, and then step 1 is performed again. The diagnostic message routing controller is configured to route and forward messages throughout the process.

According to the vehicle parallel diagnosis method provided in the embodiments of the present disclosure, a diagnostic request message received during server diagnosis may be delayed and circularly retransmitted until the server diagnosis is completed, whereby a diagnostic crash may be avoided through a crash backoff strategy, and the situation where a diagnostic request is not responded to or the diagnostic request is ignored may be effectively avoided. Compared with the problem of diagnostic conflicts in multiple possible vehicle parallel diagnosis scenarios such as production line electric detection, road test, air upgrade, and remote diagnostic in the related technology, the requirements for full-time vehicle parallel diagnosis may be truly met, and full-time multi-path parallel diagnosis may be achieved.

Next, a vehicle parallel diagnosis apparatus according to an embodiment of the present disclosure will be described with reference to the accompanying drawings.

Figure 11:
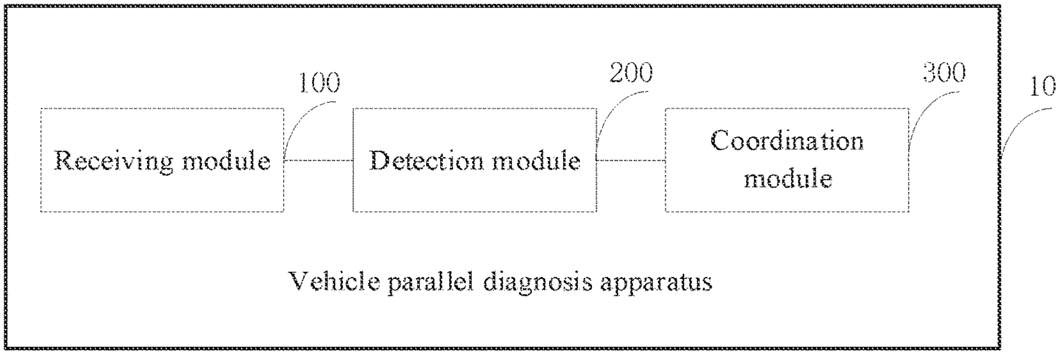
FIG. 11 is a schematic block diagram of a vehicle parallel diagnosis apparatus according to an embodiment of the present disclosure.

FIG. 11 is a schematic block diagram of a vehicle parallel diagnosis apparatus according to an embodiment of the present disclosure.

As shown in FIG. 11, the vehicle parallel diagnosis apparatus 10 includes: a receiving module 100, a detection module 200, and a coordination module 300.

The receiving module 100 is configured to receive a diagnostic request message transmitted by a random client. The detection module 200 is configured to detect a current diagnostic state of a diagnostic server after the diagnostic request message is received, the current diagnostic state including a completed state and an uncompleted state. The coordination module 300 is configured to forward, when the current diagnostic state is the completed state, the diagnostic request message to the diagnostic server via a target routing controller, otherwise control the random client to retransmit the diagnostic request message after a target delay duration until the diagnostic server is in the completed state, and forward the diagnostic request message to the diagnostic server via the target routing controller so as to process the diagnostic request message.

In the embodiments of the present disclosure, the apparatus 10 according to an embodiment of the present disclosure further includes a calculation module. The calculation module is configured to acquire an accumulated number of retransmissions of the diagnostic request message before controlling the random client to retransmit the diagnostic request message after a target delay duration, and determine the target delay duration according to the accumulated number.

In the embodiments of the present disclosure, the calculation module is further configured to: determine whether the accumulated number reaches a predetermined number; calculate the target delay duration according to the accumulated number when the accumulated number is less than or equal to the predetermined number, and generate a delay queue based on the target delay duration corresponding to each delay when the accumulated number is equal to the predetermined number; and randomly acquire the target delay duration from the delay queue when the accumulated number is greater than the predetermined number.

In the embodiments of the present disclosure, a calculation formula of the target delay duration is:

$$\text{target duration}=2^{N}*\Delta T,$$

where N is the accumulated number, and ΔT is a predetermined interval duration.

In the embodiments of the present disclosure, the detection module 200 is further configured to: detect an actual detection duration of the diagnostic server; determine that the current diagnostic state is the completed state when the actual detection duration is greater than a predetermined diagnostic duration; and determine, if a response message transmitted by the diagnostic server is received, that the current diagnostic state is the completed state, otherwise determine that the current diagnostic state is the uncompleted state, when the actual detection duration is less than or equal to the predetermined diagnostic duration.

In the embodiments of the present disclosure, the coordination module 300 is further configured to: acquire, in the presence of a plurality of diagnostic request messages actually, an actual request moment of each diagnostic request message; and forward a diagnostic request message corresponding to the earliest actual request moment to the diagnostic server, and update the current diagnostic state into the uncompleted state.

In the embodiments of the present disclosure, the coordination module 300 is further configured to: acquire, in the presence of a plurality of diagnostic request messages corresponding to the earliest actual request moment, an actual diagnostic type corresponding to each diagnostic request message; and match a priority of each diagnostic request message according to the actual diagnostic type, and forward a diagnostic request message with the highest priority to the diagnostic server.

It is to be noted that the foregoing explanation of the embodiments of the vehicle parallel diagnosis method is also applicable to the vehicle parallel diagnosis apparatus of this embodiment, and will not be repeated herein.

According to the vehicle parallel diagnosis apparatus provided in the embodiments of the present disclosure, a diagnostic request message received during server diagnosis may be delayed and circularly retransmitted until the server diagnosis is completed, whereby a diagnostic crash may be avoided through a crash backoff strategy, and the situation where a diagnostic request is not responded to or the diagnostic request is ignored may be effectively avoided. Compared with the problem of diagnostic conflicts in multiple possible vehicle parallel diagnosis scenarios such as production line electric detection, road test, air upgrade, and remote diagnostic in the related technology, the requirements for full-time vehicle parallel diagnosis may be truly met, and full-time multi-path parallel diagnosis may be achieved.

Figure 12:
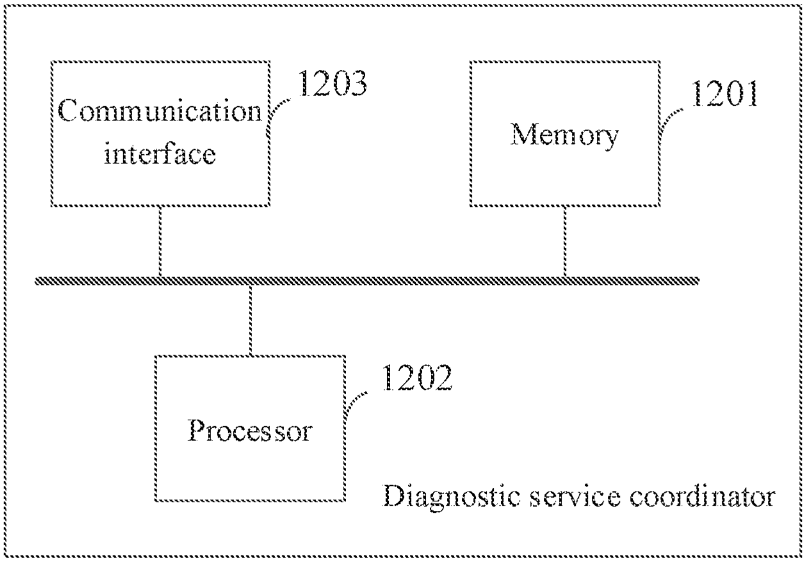
FIG. 12 is a schematic structural diagram of a diagnostic service coordinator according to an embodiment of the present disclosure.

FIG. 12 is a schematic structural diagram of a diagnostic service coordinator according to an embodiment of the present disclosure. The vehicle may include:

- a memory 1201, a processor 1202, and a computer program stored on the memory 1201 and executable on the processor 1202.

The processor 1202, when executing the program, implements the vehicle parallel diagnosis method provided in the foregoing embodiments.

Further, the diagnostic service coordinator also includes:

- a communication interface 1203 for communication between the memory 1201 and the processor 1202.

The memory 1201 is configured to store the computer program executable on the processor 1202.

The memory 1201 may include a high velocity random access memory (RAM), and may also include a non-volatile memory, such as at least one disk memory.

If the memory 1201, the processor 1202, and the communication interface 1203 are implemented independently, the communication interface 1203, the memory 1201, and the processor 1202 may be connected to each other via a bus and communicate with each other. The bus may be an industry standard architecture (ISA) bus, a peripheral component (PCI) bus or an extended industry standard architecture (EISA) bus, and the like. The bus may be divided into an address bus, a data bus, a control bus, and the like. For ease of illustration, the bus is represented by only one bold line in FIG. 12. However, it is not indicated that there is only one bus or type of bus.

Optionally, in a specific implementation, if the memory 1201, the processor 1202, and the communication interface 1203 are integrated on one chip, the memory 1201, the processor 1202, and the communication interface 1203 may communicate with each other through an internal interface.

The processor 1202 may be a central processing unit (CPU), or an application specific integrated circuit (ASIC), or one or more integrated circuits configured to implement the embodiments of the present disclosure.

Embodiments of the present disclosure also provide a computer-readable storage medium, including a computer program stored thereon. The program, when executed by a processor, implements the vehicle parallel diagnosis method as described above.

In the descriptions of this specification, references to the descriptions of the terms "one embodiment", "some embodiments", "example", "specific example", or "some examples", etc. mean that a particular feature, structure, material, or characteristic described in connection with this embodiment or example is included in at least one embodiment or example of the present disclosure. In this specification, schematic representations of the foregoing terms are not necessarily directed to the same embodiment or example. Moreover, the particular feature, structure, material, or characteristic described may be combined in any suitable manner in any one or N embodiments or examples. Furthermore, different embodiments or examples described in this specification and features of different embodiments or examples may be combined by those skilled in the art without contradicting one another.

Furthermore, the terms "first" and "second" are used for descriptive purposes only and are not to be construed as indicating or implying relative importance or as implicitly indicating the number of technical features indicated. Thus, features defined as "first" or "second" may explicitly or implicitly include at least one of the features. In the description herein, "N" means at least two, e.g. two, three, etc. unless specifically limited otherwise.

Any process or method description in a flowchart or otherwise described herein may be understood to represent a module, segment or portion of code including one or N executable instructions for implementing custom logic functions or process steps, and the scope of the preferred implementations of the present application includes additional implementations. The functions may be performed in a substantially simultaneous manner, or in a reverse order, out of the order shown or discussed, according to the functionality involved, as would be understood by those skilled in the art to which the embodiments of the present application pertain.

It will be understood that portions of the present disclosure may be implemented in hardware, software, firmware, or a combination thereof. In the foregoing embodiments, the N steps or methods may be implemented in software or firmware stored in the memory and executed by a suitable instruction execution system. If implemented in hardware as in another embodiment, it may be implemented using any one or combination of the following technologies known in the art: discrete logic circuits having logic gates for implementing logic functions on data signals, application specific integrated circuits having suitable combinational logic gates, programmable gate arrays, field programmable gate arrays, and the like.

It will be appreciated by those of ordinary skill in the art that all or a portion of the steps carried out by the method of the above embodiments may be performed through related hardware instructed by a program. The program may be stored in a computer-readable storage medium. The program, when executed, includes one of the steps in the method embodiments or a combination thereof.

While the embodiments of the present disclosure have been shown and described above, it will be understood that the foregoing embodiments are exemplary and are not to be construed as limitations of the present disclosure, and that variations, modifications, substitutions, and alterations to the foregoing embodiments may be made by those of ordinary skill in the art within the scope of the present disclosure.

The invention claimed is:

1. A vehicle parallel diagnosis method, comprising the following steps:

executing, by a diagnostic service coordinator:

receiving a first diagnostic request message transmitted by at least one client;

forwarding, if the diagnostic service coordinator is idle, the first diagnostic request message to a diagnostic server via a target routing controller;

receiving a second diagnostic request message transmitted by the at least one client;

detecting a current diagnostic state of the diagnostic server with respect to the first diagnostic request message after the second diagnostic request message is received, the current diagnostic state comprising a completed state and an uncompleted state; and forwarding, if the current diagnostic state is the completed state, the second diagnostic request message to the diagnostic server via the target routing controller, otherwise controlling, if the current diagnostic state is the uncompleted state, the at least one client to retransmit the second diagnostic request message after a target delay duration until the diagnostic server is in the completed state, and forwarding the second diagnostic request message to the diagnostic server via the target routing controller; and performing a first diagnostic on the at least one client via the diagnostic server in response to the first diagnostic request message, and performing a second diagnostic on the at least one client via the diagnostic server in response to the second diagnostic request message, thereby diagnosing a vehicle wherein after the target delay duration, and before controlling the at least one client to retransmit the second diagnostic request message, the diagnostic service coordinator further executes:

acquiring an accumulated number of retransmissions of the second diagnostic request message; and determining the target delay duration according to the accumulated number; and wherein the determining the target delay duration according to the accumulated number comprises:

determining whether the accumulated number reaches a predetermined number;

calculating the target delay duration according to the accumulated number when the accumulated number is less than or equal to the predetermined number, and generating a delay queue based on the target delay duration corresponding to each delay when the accumulated number is equal to the predetermined number; and randomly acquiring the target delay duration from the delay queue when the accumulated number is greater than the predetermined number;

wherein a calculation formula of the target delay duration is:

target duration=$2^N*\Delta T$, wherein N is the accumulated number, and $\Delta T$ is a predetermined interval duration.

2. The method according to claim 1, wherein the detecting a current diagnostic state of a diagnostic server comprises:

detecting an actual detection duration of the diagnostic server;

determining that the current diagnostic state is the completed state when the actual detection duration is greater than a predetermined diagnostic duration; and determining, if a response message transmitted by the diagnostic server is received, that the current diagnostic state is the completed state, otherwise determining that the current diagnostic state is the uncompleted state, when the actual detection duration is less than or equal to the predetermined diagnostic duration.

3. The method according to claim 1, wherein the forwarding the second diagnostic request message to the diagnostic server further comprises:

acquiring, in the presence of a plurality of second diagnostic request messages actually, an actual request moment of each second diagnostic request message; and forwarding a second diagnostic request message corresponding to the earliest actual request moment to the diagnostic server, and updating the current diagnostic state into the uncompleted state.

4. The method according to claim 3, wherein the forwarding a second diagnostic request message corresponding to the earliest actual request moment to the diagnostic server comprises:

acquiring, in the presence of a plurality of second diagnostic request messages corresponding to the earliest actual request moment, an actual diagnostic type corresponding to each second diagnostic request message; and matching a priority of each second diagnostic request message according to the actual diagnostic type, and forwarding a second diagnostic request message with the highest priority to the diagnostic server.

5. A vehicle parallel diagnosis system, comprising:

at least one client, configured to transmit a first diagnostic request message and a second diagnostic request message;

a diagnostic service coordinator, comprising: a non-transitory memory, a processor, and a computer program stored on the non-transitory memory and executable on the processor, the processor configured to execute the program to implement:

receiving the first diagnostic request message transmitted by the at least one client;

forwarding, if the diagnostic service coordinator is idle, the first diagnostic request message to a diagnostic server via a target routing controller;

receiving the second diagnostic request message transmitted by the at least one client;

detecting a current diagnostic state of the diagnostic server with respect to the first diagnostic request message after the second diagnostic request message is received, the current diagnostic state comprising a completed state and an uncompleted state; and forwarding, if the current diagnostic state is the completed state, the second diagnostic request message to the diagnostic server via the target routing controller, otherwise controlling, if the current diagnostic state is the uncompleted state, the at least one client to retransmit the second diagnostic request message after a target delay duration until the diagnostic server is in the completed state, and forwarding the second diagnostic request message to the diagnostic server via the target routing controller; and a diagnostic server, configured to perform a first diagnostic on the at least one client in response to the first diagnostic request message, and perform a second diagnostic on the at least one client in response to the second diagnostic request message, thereby diagnosing a vehicle wherein after the target delay duration, and before controlling the at least one client to retransmit the second diagnostic request message, the processor is configured to execute the program to further implement:

acquiring an accumulated number of retransmissions of the second diagnostic request message; and determining the target delay duration according to the accumulated number; and wherein the determining the target delay duration according to the accumulated number comprises:

determining whether the accumulated number reaches a predetermined number;

calculating the target delay duration according to the accumulated number when the accumulated number is less than or equal to the predetermined number, and generating a delay queue based on the target delay duration corresponding to each delay when the accumulated number is equal to the predetermined number; and randomly acquiring the target delay duration from the delay queue when the accumulated number is greater than the predetermined number;

wherein a calculation formula of the target delay duration is:

target duration=$2^N*\Delta T$, wherein N is the accumulated number, and $\Delta T$ is a predetermined interval duration.

6. The system according to claim 5, wherein the detecting a current diagnostic state of a diagnostic server comprises:

detecting an actual detection duration of the diagnostic server;

determining that the current diagnostic state is the completed state when the actual detection duration is greater than a predetermined diagnostic duration; and determining, if a response message transmitted by the diagnostic server is received, that the current diagnostic state is the completed state, otherwise determining that the current diagnostic state is the uncompleted state, when the actual detection duration is less than or equal to the predetermined diagnostic duration.

7. The system according to claim 5, wherein the forwarding the second diagnostic request message to the diagnostic server further comprises:

acquiring, in the presence of a plurality of second diagnostic request messages actually, an actual request moment of each second diagnostic request message; and forwarding a second diagnostic request message corresponding to the earliest actual request moment to the diagnostic server, and updating the current diagnostic state into the uncompleted state.

8. The system according to claim 7, wherein the forwarding a second diagnostic request message corresponding to the earliest actual request moment to the diagnostic server comprises:

acquiring, in the presence of a plurality of second diagnostic request messages corresponding to the earliest actual request moment, an actual diagnostic type corresponding to each second diagnostic request message; and matching a priority of each second diagnostic request message according to the actual diagnostic type, and forwarding a second diagnostic request message with the highest priority to the diagnostic server.

* * * * *